United States Patent
Daniel

(10) Patent No.: US 10,413,989 B2
(45) Date of Patent: Sep. 17, 2019

(54) AUTOMATIC NOTIFICATION FOR CONSUMABLE PACKAGE REPLACEMENT

(71) Applicant: Lincoln Global, Inc., City of Industry, CA (US)

(72) Inventor: Joseph A. Daniel, Sagamore Hills, OH (US)

(73) Assignee: LINCOLN GLOBAL, INC., Sante Fe Springs, CA (US)

(*) Notice: Subject to any disclaimer, the term of this patent is extended or adjusted under 35 U.S.C. 154(b) by 18 days.

(21) Appl. No.: 15/210,103

(22) Filed: Jul. 14, 2016

(65) Prior Publication Data
US 2016/0318116 A1   Nov. 3, 2016

Related U.S. Application Data

(62) Division of application No. 13/551,660, filed on Jul. 18, 2012, now abandoned.

(51) Int. Cl.
*B23K 9/32*     (2006.01)
*B23K 9/133*    (2006.01)
(Continued)

(52) U.S. Cl.
CPC .......... *B23K 9/32* (2013.01); *B23K 9/133* (2013.01); *B23K 9/1336* (2013.01);
(Continued)

(58) Field of Classification Search
CPC ...... B23K 9/133; B23K 9/1333; B23K 9/125; B65H 63/08; B65H 63/082; B65H 63/084; B65H 63/086; B65H 67/02; B65H 67/06
See application file for complete search history.

(56) References Cited

U.S. PATENT DOCUMENTS 3,093,285 A * 6/1963 Learning ............... B23K 9/1336
                                                   226/156
3,093,727 A * 6/1963 Learning ................ B23K 9/124
                                                   219/137.7
(Continued)

FOREIGN PATENT DOCUMENTS

EP    0 468 953 A2    1/1992
EP    1 393 846 B1    3/2004
(Continued)

OTHER PUBLICATIONS

Clare Goldsberry, Bulked-up Electrode Packages Extend Weld Time, May 28, 2008, 3 pages, http://weldingdesign.com/comsumables/wdf_77876/.
(Continued)

*Primary Examiner* — Ibrahime A Abraham
*Assistant Examiner* — Frederick F Calvetti
(74) *Attorney, Agent, or Firm* — Brad C. Spencer

(57) ABSTRACT

Methods for determining that a consumable welding package has been, or may have been, replenished in a high production welding environment and that a tracked weight value of the consumable welding package should be reset. An operator of a welding system can be notified that a consumable welding package may have been replenished and, therefore, that the weight value of the consumable welding package may need to be reset in the welding system. Alternatively, the weight value of the consumable welding package in the welding system may be automatically reset when the welding system has determined that the consumable welding package has been replenished.

13 Claims, 5 Drawing Sheets

(51) Int. Cl.
  *B65H 63/08* (2006.01)
  *B65H 67/02* (2006.01)
(52) U.S. Cl.
  CPC ........... *B65H 63/084* (2013.01); *B65H 67/02* (2013.01); *B65H 2701/36* (2013.01)

(56) References Cited

U.S. PATENT DOCUMENTS

| | | | |
|---|---|---|---|
| 4,581,514 A | 4/1986 | Inoue | |
| 4,674,668 A | 6/1987 | Cooke | |
| 6,066,833 A | 5/2000 | Rigdon | |
| 6,267,291 B1 | 7/2001 | Blankenship | |
| 6,476,354 B1 | 11/2002 | Jank | |
| 6,536,660 B2 | 3/2003 | Blankenship | |
| 6,563,085 B2 | 5/2003 | Lanouette | |
| 6,708,877 B2 | 3/2004 | Blankenship | |
| 6,720,529 B2 | 4/2004 | Davidson | |
| 6,786,404 B1 * | 9/2004 | Bonner | B07C 3/00 235/383 |
| 7,032,814 B2 * | 4/2006 | Blankenship | B23K 9/1062 219/54 |
| 7,072,774 B1 * | 7/2006 | Houston | B23K 9/0953 219/69.15 |
| 7,186,944 B2 | 3/2007 | Matus | |
| 7,645,960 B2 * | 1/2010 | Stava | B23K 9/1062 219/130.21 |
| 7,761,336 B1 * | 7/2010 | Blankenship | B23K 9/1062 219/121.11 |
| 8,049,139 B2 * | 11/2011 | Houston | B23K 9/0953 219/130.01 |
| 2003/0052107 A1 * | 3/2003 | Suzuki | B23K 9/0953 219/130.01 |
| 2006/0070987 A1 | 4/2006 | Daniel | |
| 2007/0080153 A1 | 4/2007 | Albrecht | |
| 2010/0096375 A1 | 4/2010 | Daniel | |
| 2011/0180522 A1 | 7/2011 | Bunker | |

FOREIGN PATENT DOCUMENTS

| | | |
|---|---|---|
| FR | 2 527 661 A1 | 12/1983 |
| JP | 2009-178747 A | 8/2009 |

OTHER PUBLICATIONS

Patent Board Decision from Corresponding U.S. Appl. No. 13/551,660; dated Oct. 26, 2017.

\* cited by examiner

AUTOMATIC NOTIFICATION FOR CONSUMABLE PACKAGE REPLACEMENT

TECHNICAL FIELD

Certain embodiments of the present invention relate to welding. More particularly, certain embodiments of the present invention relate to systems and methods for determining that a consumable welding package has been replenished in a high production welding environment and that a tracked weight value of the consumable welding package should be reset.

BACKGROUND

In high production welding environments today, the weight of a consumable welding package is often tracked as the consumable welding wire from the consumable welding package is consumed during a welding process by a welding system. When the weight approaches a low level (indicating that the amount of consumable welding wire in the package is running low), an operator of the welding system can be warned that the consumable welding package will need to be replenished soon. When the welding package is replenished, the operator should reset the weight value in the welding system to the full, known weight of the welding package. In this manner, the welding system can again track the weight of the welding package from the replenished value to lower values as the welding process continues and welding wire is consumed. However, sometimes the operator may not reset the weight value when the welding package is replenished because the operator may forget, or the operator may become distracted. If the weight value is not reset, then the amount of welding wire in the welding package cannot be properly tracked and the operator will not be properly warned when the welding wire in the welding package runs low again. Unacceptable delays in the welding process can result from such improper tracking of the consumable welding package.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention provide systems and methods for notifying an operator of a welding system that a consumable welding package may have been replenished and, therefore, the weight value of the consumable welding package may need to be reset in the welding system. Other embodiments of the present invention relate to systems and methods for automatically resetting the weight value of the consumable welding package in the welding system when the welding system has determined that the consumable welding package has been replenished.

One embodiment of the present invention is a method. The method includes sensing at least one characteristic associated with replenishing a consumable welding package in a welding system and determining if the at least one characteristic is a weak indicator or a strong indicator that the consumable welding package has been replenished. The method further includes automatically prompting an operator of the welding system to manually reset a weight value of the consumable welding package within the welding system when the at least one characteristic is determined to be a weak indicator. The method also includes automatically resetting the weight value of the consumable welding package within the welding system when the at least one characteristic is determined to be a strong indicator. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals. The prompting step may include at least one of displaying a message to an operator of the welding system on a display of the welding system, activating an alarm of the welding system, and sending a message to a computer device of the operator of the welding system. The method may further include manually resetting the weight of the consumable welding package by entering a weight value of a consumable welding package into the welding system via a user interface of the welding system.

One embodiment of the present invention is a method. The method includes sensing at least one characteristic associated with replenishing a consumable welding package in a welding system and determining that the at least one characteristic indicates that the consumable welding package may have been replenished. The method also includes automatically prompting an operator of the welding system to manually reset a weight value of the consumable welding package within the welding system in response to the determining step. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals. The prompting step may include at least one of displaying a message to an operator of the welding system on a display of the welding system, activating an alarm of the welding system, and sending a message to a computer device of the operator of the welding system. The method may further include manually resetting the weight of the consumable welding package by entering a weight value of a consumable welding package into the welding system via a user interface of the welding system.

One embodiment of the present invention is a method. The method includes sensing at least one characteristic associated with replenishing a consumable welding package in a welding system, and determining that the at least one characteristic indicates that the consumable welding package has been replenished. The method also includes automatically resetting the weight value of the consumable welding package within the welding system in response to the determining step. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals.

One embodiment of the present invention is a welding system. The welding system includes means for sensing at least one characteristic associated with replenishing a consumable welding package of the welding system. The welding system also includes means for determining if the at least one characteristic is a weak indicator or a strong indicator that the consumable welding package has been replenished. The welding system further includes means for automatically prompting an operator of the welding system to manually reset a weight value of the consumable welding package within the welding system when the at least one characteristic is determined to be a weak indicator. The welding system also includes means for automatically resetting the weight value of the consumable welding package within the welding system when the at least one characteristic is determined to be a strong indicator. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals. The welding system may further include means for manually resetting the weight value of the consumable welding package within the welding system.

One embodiment of the present invention is a welding system. The welding system includes means for sensing at least one characteristic associated with replenishing a consumable welding package of the welding system. The welding system also includes means for determining that the at least one characteristic indicates that the consumable welding package may have been replenished. The welding system further includes means for automatically prompting an operator of the welding system to manually reset a weight value of the consumable welding package within the welding system in response to determining that the at least one characteristics indicates that the consumable welding package may have been replenished. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals. The welding system may further include means for manually resetting the weight value of the consumable welding package.

One embodiment of the present invention is a welding system. The welding system includes means for sensing at least one characteristic associated with replenishing a consumable welding package in a welding system. The welding system also includes means for determining that the at least one characteristic indicates that the consumable welding package has been replenished. The welding system further includes means for automatically resetting a weight value of a consumable welding package within the welding system in response to determining that the at least one characteristic indicates that the consumable welding package has been replenished. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals.

One embodiment of the present invention is a welding system. The welding system includes a consumable welding package including a consumable welding wire, a welding tool, a welding power source configured to provide electrical power to the welding tool, and a wire feeder configured to feed the consumable welding wire from the consumable welding package to the welding tool. The wire feeder is also configured to provide wire feeding information, associated with feeding the consumable welding wire, to the welding power source. The welding power source is further configured to determine at least one characteristic associated with replenishing the consumable welding package, determine if the at least one characteristic is a weak indicator or a strong indicator that the consumable welding package has been replenished, automatically prompt an operator of the welding system to manually reset a weight value of the consumable welding package within the welding system when the at least one characteristic is determined to be a weak indicator, and automatically reset the weight value of the consumable welding package within the welding system when the at least one characteristic is determined to be a strong indicator. The welding power source may be configured to determine at least one characteristic associated with replenishing the consumable welding package in response to at least a portion of the wire feeding information. The wire feeding information may include one or more of wire feed speed, a time duration of wire feeding, and a cold-inching signal indicating that the wire feeder is in a cold-inching mode. The characteristic may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals.

Details of illustrated embodiments of the present invention will be more fully understood from the following description and drawings.

DETAILED DESCRIPTION

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Sense", and its various forms as used herein, can mean to detect, to receive, to determine, to monitor, or to calculate.

"Replenish", and its various forms as used herein, can mean to replace, to refill, to provide, to restock, or to restore.

"Consumable welding package", as used herein, can mean a drum of consumable welding wire, a box of consumable welding wire, a spool of consumable welding wire, a palette of consumable welding wire, or equivalents thereof.

"Indicate", and its various forms as used herein, can mean to signify, to imply, to show, or to evince.

"Weak indicator", as used herein, can mean a clue, a signal, data, or information suggesting that something may have happened, but very possibly not.

"Strong indicator", as used herein, can mean a clue, a signal, data, or information suggesting that something has likely happened, but possibly not.

"Prompt", and its various forms as used herein, can mean to make aware, to notify, to present a question, or to present a suggestion.

"Welding tool", as used herein, can mean a welding gun, a welding torch, or any welding device that accepts a consumable welding wire for the purpose of applying electrical power to the consumable welding wire provided by a welding power source.

Figure 1:
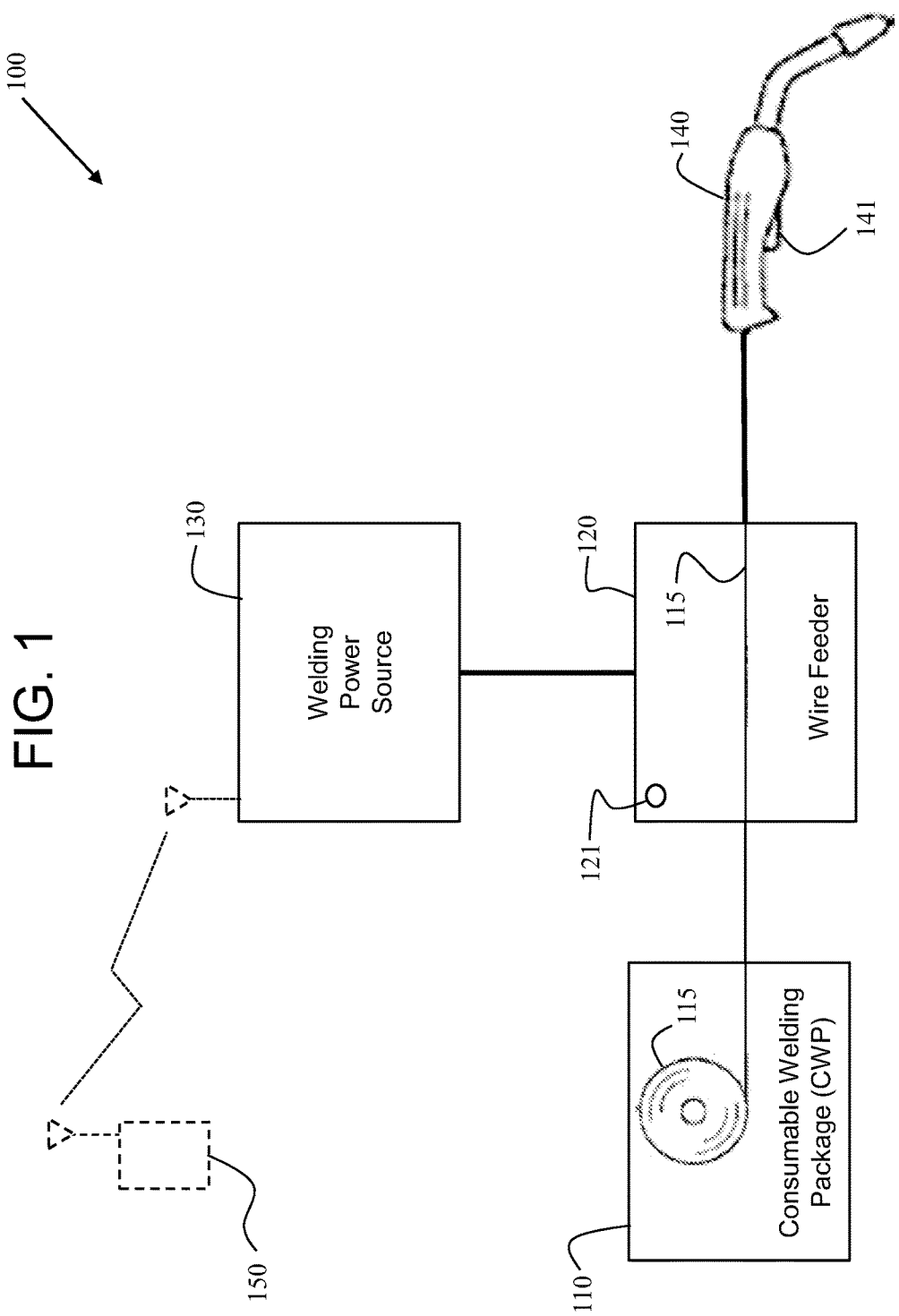
FIG. 1 illustrates a schematic block diagram of an exemplary embodiment of a welding system including a consumable welding package.

FIG. 1 illustrates a schematic block diagram of an exemplary embodiment of a welding system 100 including a consumable welding package 110. The system also includes a wire feeder 120, a welding power source 130, and a welding tool 140. The welding wire feeder 120 includes a cold-inching button 121 that is used to activate a cold-inching mode or function of the wire feeder 120. The cold-inching function is described later herein in more detail.

The consumable welding package (CWP) 110 includes consumable welding wire 115 that may be fed by the wire feeder 120 from the CWP 110 to the welding tool 140. The welding power source 130 provides electrical power to the welding tool 140 which can be applied to the welding wire 115 at the welding tool 140, for example, for the purpose of welding a workpiece. In a high production welding environment, it is desirable to know when the amount of consumable welding wire 115 in the CWP 110 is getting low such that action may be taken to replenish the CWP 110.

The welding power source 130 is configured to communicate with the wire feeder 120, in accordance with an embodiment. For example, the wire feeder 120 may provide signals and/or data to the welding power source 130. Similarly, the welding power source 130 may provide signals and/or data to the wire feeder 120. Communication between the welding power source 130 and the wire feeder 120 may be via wired or wireless means, in accordance with various embodiments of the present invention. Also, as an option, the welding power source 130 may be configured to communicate with a computer device 150 used by an operator of the welding system. For example, the computer device 150 may be a mobile computer device carried by the operator, or a desk top computer sitting on a desk. Communication between the welding power source 130 and the computer device 150 may be via wired means or wireless (e.g., radio frequency or infrared) means, in accordance with various embodiments of the present invention.

Figure 2:
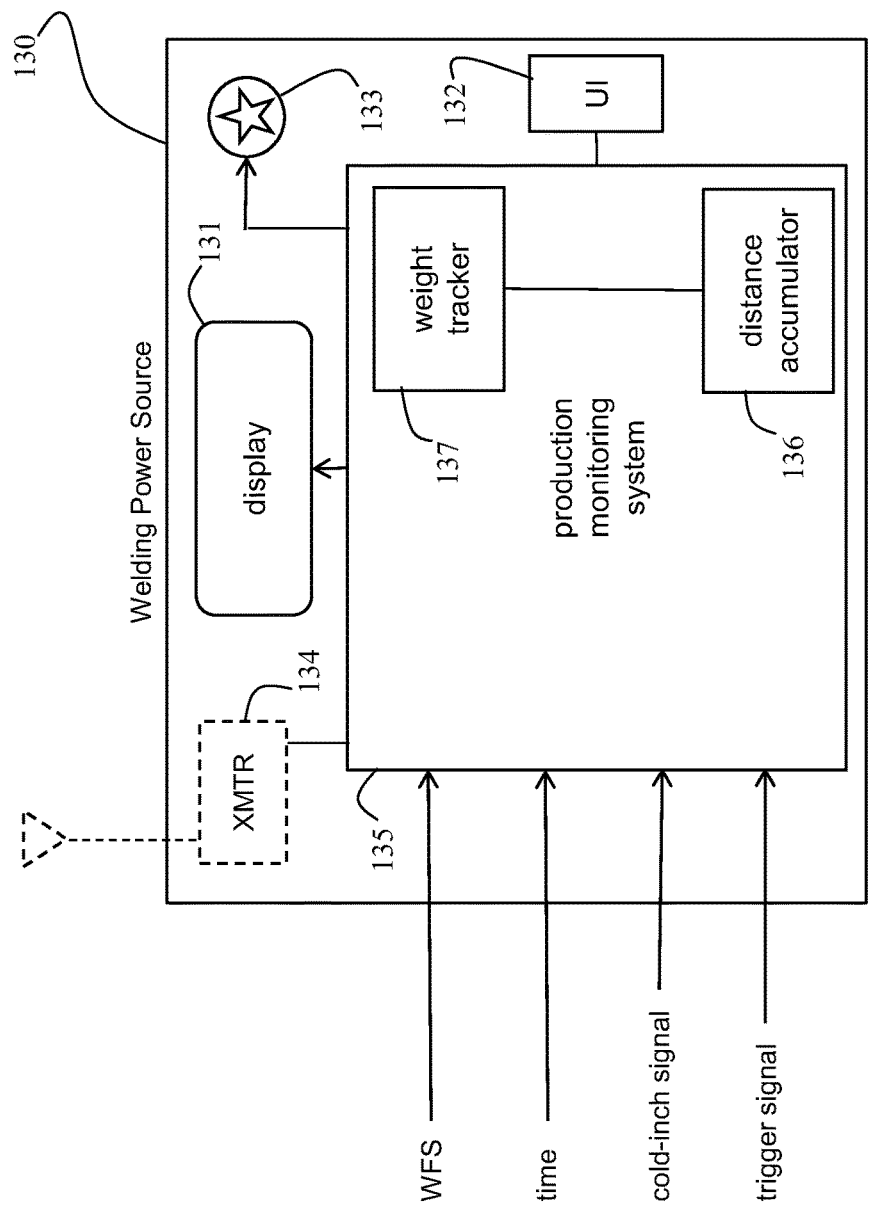
FIG. 2 illustrates a schematic block diagram of an exemplary embodiment of a welding power source used in the welding system of FIG. 1.

FIG. 2 illustrates a schematic block diagram of an exemplary embodiment of a welding power source 130 used in the welding system 100 of FIG. 1. The welding power source 130 provides electrical power in the form of welding waveforms that are to be applied to a welding electrode such as a consumable welding wire 115 at a welding tool 140. In accordance with various embodiments, the welding power source 130 may include inverter or chopper type circuitry, a waveform generator, a state machine, and other circuitry and software used to control the electrical currents applied to a welding electrode during various welding processes or modes.

In accordance with an embodiment of the present invention, the welding power source 130 includes a production monitoring system 135 which keeps track of various production information such as, for example, number of welds produced per hour, arc time per day, and amount of welding wire used. The production monitoring system 135 is implemented in software on a processing element of the welding power source 130, in accordance with an embodiment.

The production monitoring system 135 of the welding power source 130 receives wire feed speed (WFS) information, time information associated with feeding wire, and a cold-inch signal from the wire feeder 120. The WFS information provides the actual speed at which the consumable welding wire 115 is being fed. The time information provides a time duration interval over which the wire is fed at the WFS. The cold-inch signal indicates when the wire feeder 120 is in a cold-inching mode.

In accordance with an embodiment, the cold-inching mode may be activated by an operator of the welding system 100 by pressing the cold-inching button 121 on the wire feeder 120. During the cold-inching mode, the cold-inching signal is generated and the welding wire 115 is fed through the wire feeder 120 without electrical power being applied to the welding wire 115. The cold-inching mode is used when an operator wants to, for example, initially load wire 115 from a new CWP 110 into the welding tool 140 without actually welding. As a result, the cold-inching mode provides a measure of safety when initially loading welding wire 115 into the system 100 and the cold-inching signal may constitute a characteristic associated with replenishing a CWP 110.

The production monitoring system 135 also receives a trigger signal from the welding tool 140. In general, when an operator presses the trigger 141 on the welding tool 140, the trigger signal is generated, the welding wire 115 is advanced by the wire feeder 120 through the welding tool 140 at the command of the welding power source 130, and electrical power from the welding power source 130 is applied to the welding wire 115 at the welding tool 140 (e.g., via a contact tip mechanism), assuming that the welding wire 115 has reached the welding tool 140. This corresponds to normal welding operation during a welding process where actual welding is taking place.

However, an operator may reload welding wire from the CWP 110 through the wire feeder 120 to the welding tool 140 by pressing the trigger 141 in a similar manner to that of using the cold-inching mode. Such a re-loading method using the trigger 141 may not be as safe as that of using the cold-inching mode, but may provide the operator with more fine control over the loading process. Therefore, the trigger signal may constitute a characteristic associated with replenishing a CWP 110.

In some scenarios, an operator may use a combination of cold-inching and triggering to re-load new welding wire 115 from a replenished CWP 110. For example, an operator of the welding system 100 may press and release the cold-inching button 121 and/or the trigger 141 multiple times in an effort to reload welding wire 115 from a replenished CWP 110 through the wire feeder 120 and into the welding tool 140. Therefore, a sequence of cold-inching signals, a sequence of trigger signals, or a sequence of cold-inching signals interspersed with trigger signals may constitute characteristics associated with replenishing a CWP 110.

The welding power source 130 also includes a display 131, a user interface 132, and an alarm 133 each in operative communication with the production monitoring system 135. As an option, the welding power source 130 may include a transmitter 134 (e.g., a radio frequency transmitter) in operative communication with the production monitoring system 135. The uses of the display 131, the user interface 132, the alarm 133, and the transmitter 134 are described in detail later herein.

The production monitoring system 135 of the welding power source 130 also includes a distance accumulator 136. In accordance with an embodiment, the distance accumulator 136 uses the WFS information and the time information to determine the length of welding wire 115 that has been fed, for example, when an operator is re-loading new welding wire 115 from the CWP 110 through the wire feeder 120 to the welding tool 140, or when the operator is actually welding with the welding tool 140. Therefore, the length of welding wire fed during a cold-inching mode or during a non-welding period using the trigger 141 may constitute characteristics associated with replenishing a CWP 110.

In accordance with an embodiment of the present invention, an operator may enter wire size and wire type information into the welding power source 130 via the user interface 132 (e.g., a keypad). The production monitoring system 135 may perform a density calculation of the wire using the wire size and wire type information to generate density information. The production monitoring system 135 of the welding power source 130 also includes a weight tracker 137. The weight tracker 137 uses the density information and the length of welding wire fed, as computed by the distance accumulator 136, to determine an amount of weight of the welding wire fed through the wire feeder thus far, and subtract the amount of weight from a weight value stored in the production monitoring system 135. The weight value corresponds to the total weight of the CWP 110 when the CWP 110 was last replenished. In this manner, the weight tracker 137 tracks the weight (and, therefore, the amount of remaining wire 115) of the CWP 110 as the welding wire 115 is consumed.

When the tracked weight reaches a defined threshold level, the welding power source 130 may trigger the alarm 133, display a message on the display 131, and/or transmit a message (e.g., as an email) from the transmitter 134 to the computer device 150 to warn the operator of the welding system 100 that the amount of welding wire 115 remaining in the CWP 110 is running low and, therefore, that the CWP 110 should be replenished soon. When the CWP 110 is replenished, the weight value corresponding to the total weight of the CWP 110 should be reset, either manually by the operator via the user interface 132, or automatically within the welding power source 130.

Figure 3:
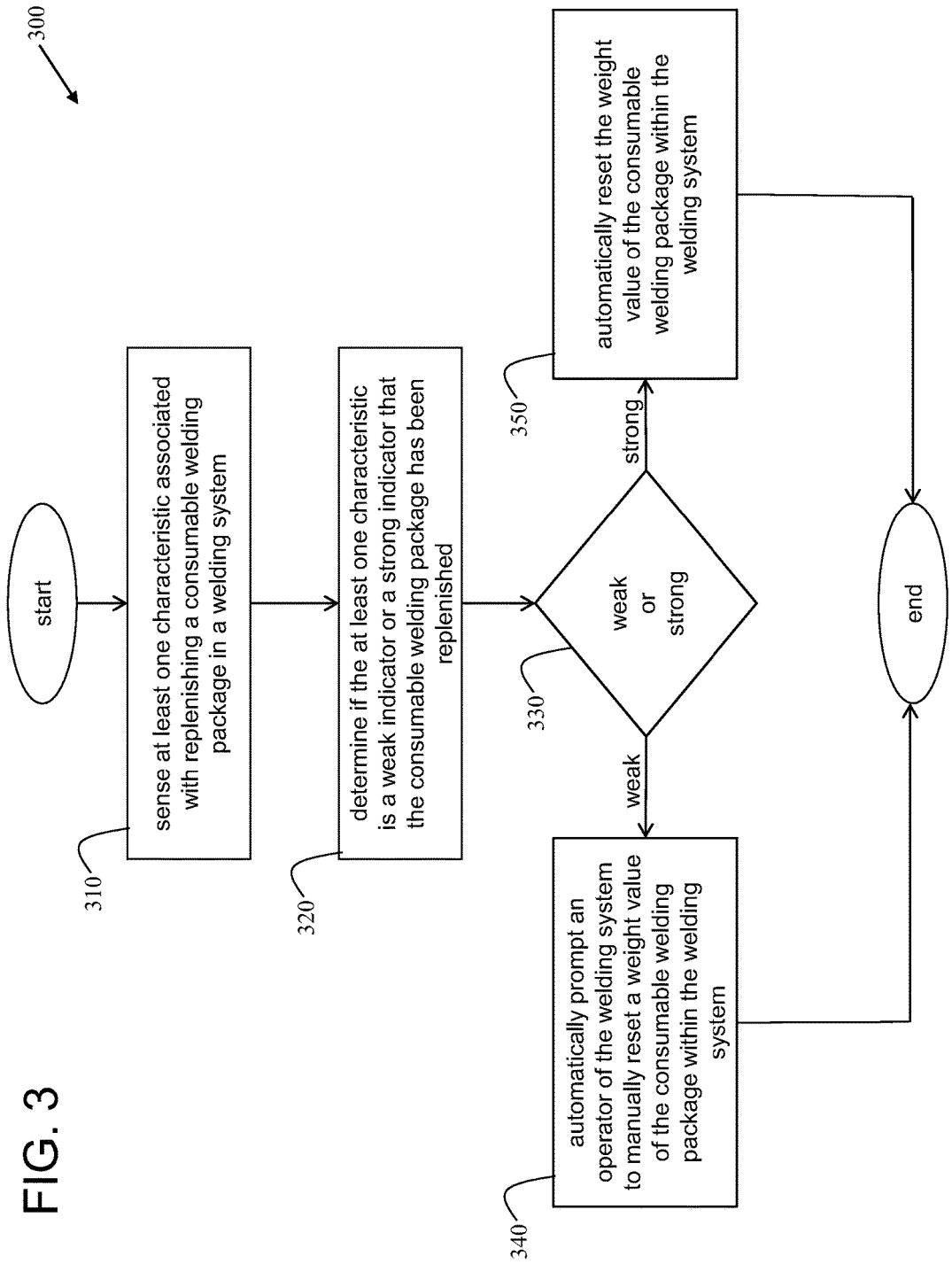
FIG. 3 is a flowchart of a first exemplary embodiment of a method for determining that a consumable welding package may have been replenished in a high production welding environment using the system of FIG. 1 having the welding power source of FIG. 2.

FIG. 3 is a flowchart of a first exemplary embodiment of a method 300 for determining that a consumable welding package 110 may have been replenished in a high production welding environment using the system 100 of FIG. 1 having the welding power source 130 of FIG. 2. In step 310 of the method 300, at least one characteristic associated with replenishing a consumable welding package in a welding system is sensed. As described previously herein, the characteristics may include one or more of a cold-inching signal indicating that the system is in a cold-inching mode, a length value of consumable welding wire fed during a cold-inching mode, a trigger signal indicating that a trigger of a welding tool is activated over a non-welding period, a length value of consumable welding wire fed over the non-welding period, a sequence of cold-inching signals, a sequence of trigger signals, and a sequence of cold-inching signals interspersed with trigger signals. Other characteristics are possible as well, in accordance with other embodiments of the present invention.

In step 320 of the method 300, it is determined if the at least one characteristic is a weak indicator or a strong indicator that the consumable welding package has been replenished. If the at least one characteristic is determined to be a weak indicator, then step 330 directs the method to step 340 where an operator of the welding system is automatically prompted to manually reset a weight value of the consumable welding package within the welding system. If the at least one characteristic is determined to be a strong indicator, then step 330 directs the method to step 350 where the weight value of the consumable welding package is automatically reset within the welding system, without intervention from the operator. Replenishing the consumable welding package 310 may involve replacing the consumable welding package with a new consumable welding package or refilling the consumable welding package with new welding wire, for example.

As an example, by monitoring WFS, time, and the cold-inch signal, the production monitoring system 135 of the welding power source 130 determines that eight feet of welding wire 115 has been fed during a cold-inching mode. The production monitoring system 135 may be programmed to consider such characteristics as a strong indicator that the CWP 110 has been replenished. Therefore, the welding power source 130 proceeds to automatically reset the weight value of the CWP 110 to, for example, 500 lbs.

As a further example, by monitoring WFS, time, and the trigger signal, the production monitoring system 135 of the welding power source 130 determines that the trigger 141 was pressed three times in sequence, advancing the welding wire 115 three feet without welding (i.e., during a non-welding period, where the wire electrode did not make contact with a workpiece). The production monitoring system 135 may be programmed to consider such characteristics as a weak indicator that the CWP 110 may have been replenished with consumable welding wire. Therefore, the welding power source 130 proceeds to activate the alarm 133 and/or send a message (e.g., "reset the weight value if the consumable welding package was replenished") to the display 131 reminding the operator to reset the weight value if the CWP 110 has indeed been replenished. As it turns out, the operator was changing a contact tip on the welding tool and advancing the welding wire 115 after changing the contact tip, not because the CWP 110 had just been replenished. Therefore, the operator, observing the alarm and/or message, chose not to reset the weight value.

Figure 4:
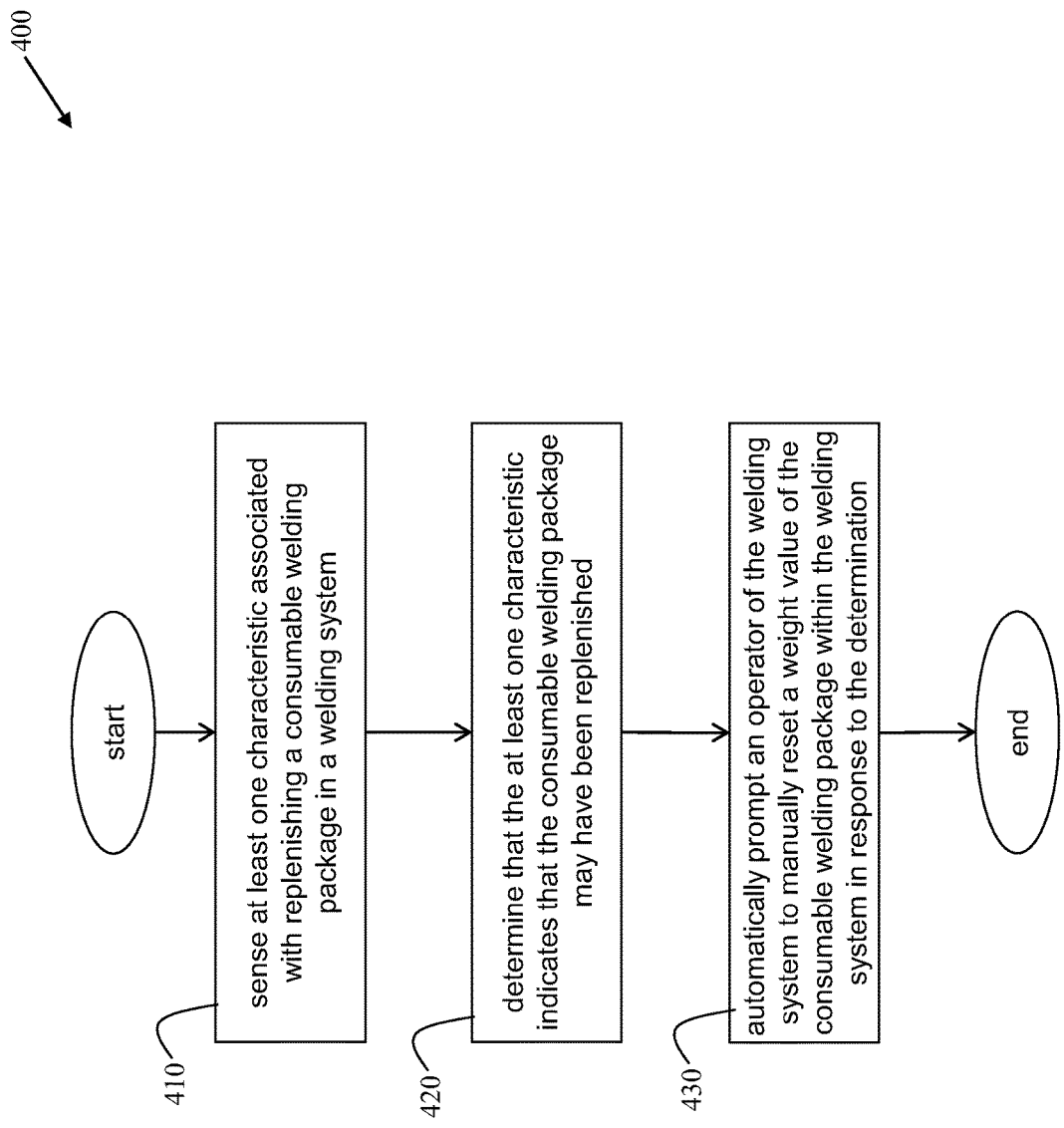
FIG. 4 is a flowchart of a second exemplary embodiment of a method for determining that a consumable welding package may have been replenished in a high production welding environment using the system of FIG. 1 having the welding power source of FIG. 2.

FIG. 4 is a flowchart of a second exemplary embodiment of a method 400 for determining that a consumable welding package may have been replenished in a high production welding environment using the system 100 of FIG. 1 having the welding power source 130 of FIG. 2. In step 410 of the method 400, at least one characteristic associated with replenishing a consumable welding package in a welding system is sensed. In step 420, it is determined that the at least one characteristic indicates that the consumable welding package may have been replenished. In step 430, an operator of the welding system is automatically prompted to manually reset a weight value of the consumable welding package within the welding system in response to the determination. The method 400 provides the operator of the welding system with a choice. The operator can choose to reset the weight value or not, depending on if the operator has determined that the CWP 110 has indeed been replenished. The prompt is to make the operator aware that he should check to determine if the CWP 110 was just replenished. In such a scenario, the system 100 is not sure enough that the CWP 110 has been replenished, but recognizes that the CWP 110 may have been replenished.

Figure 5:
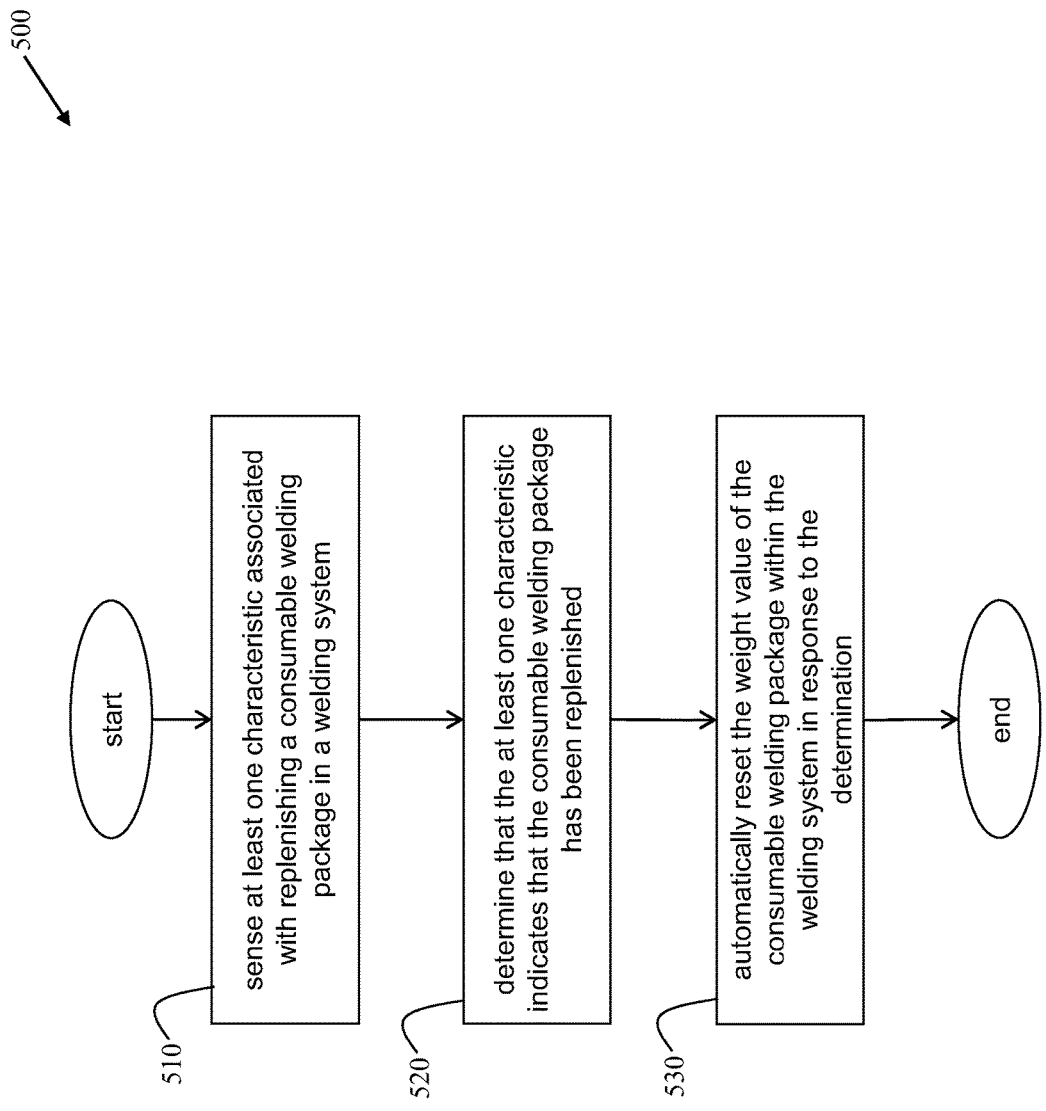
FIG. 5 is a flowchart of a third exemplary embodiment of a method for determining that a consumable welding package may have been replenished in a high production welding environment using the system of FIG. 1 having the welding power source of FIG. 2.

FIG. 5 is a flowchart of a third exemplary embodiment of a method 500 for determining that a consumable welding package may have been replenished in a high production welding environment using the system 100 of FIG. 1 having the welding power source 130 of FIG. 2. In step 510 of the method 500, at least one characteristic associated with replenishing a consumable welding package in a welding system is sensed. In step 520, it is determined that the at least one characteristic indicates that the consumable welding package has been replenished. In step 530, the weight value of the consumable welding package within the welding system is automatically reset in response to the determination. The method 500 does not involve the operator having to check if the CWP 110 was replenished or having to reset the weight value. Instead, the system 100 is quite sure that the CWP 110 was indeed replenished. Therefore, the system 100 automatically resets the welding value without involving the operator.

In accordance with various embodiments of the present invention, the production monitoring system 135 may calculate a confidence level or a likelihood that the CWP 110 was replenished and that, therefore, the weight value should be reset. For example, if the confidence level is above 95%, the system may proceed to automatically reset the weight value. Various techniques such as, for example, a Q-test may be used to determine a confidence level. In accordance with other embodiments, the system may learn or train on actual known situations of replenishing the CWP 110 and reloading the welding wire through the wire feeder 120 and into the welding tool 140. In such embodiments, the system learns to recognize those characteristics most closely associated with replenishing the CWP 110.

As an example, a particular operator of the system 100 may always use a same, or nearly same, sequence of cold-inching and welding tool triggering to re-load the welding wire after the CWP 110 has been replenished. Using one or more machine learning techniques employed in the production monitoring system 135, the system can learn to recognize the sequence and, with a high level of confidence, determine that the CWP 110 has been replenished and proceed to automatically reset the weight value. Some machine learning techniques include, for example, neural network techniques, evolutionary algorithm techniques, inductive logic techniques, support vector machine techniques, clustering techniques, and Bayesian network techniques, in accordance with various embodiments of the present invention.

In summary, systems and methods for determining that a consumable welding package has been, or may have been, replenished in a high production welding environment, and that a tracked weight value of the consumable welding package should be reset, are disclosed. An operator of a welding system can be notified that a consumable welding package may have been replenished and, therefore, that the weight value of the consumable welding package may need to be reset in the welding system. Alternatively, the weight value of the consumable welding package in the welding system may be automatically reset when the welding system has determined that the consumable welding package has been replenished.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. § 112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

The invention claimed is:

1. A method, said method comprising:
sensing at least one characteristic associated with replenishing a consumable welding package in a welding system comprising a welding power source, a wire feeder, and a welding tool, wherein the at least one characteristic includes at least one of a cold-inching signal from the wire feeder while in a cold-inching mode, and a trigger signal from the welding tool indicating that a trigger of the welding tool is activated;
automatically resetting a weight value of the consumable welding package within the welding system based on the cold-inching signal and a length of welding wire fed during the cold-inching mode; and
automatically prompting an operator of the welding system to manually reset the weight value of the consumable welding package within the welding system based on the trigger signal occurring during a non-welding period, and a length of welding wire fed during the non-welding period.

2. The method of claim 1, wherein said automatically resetting the weight value of the consumable welding package is further based on a sequence of cold-inching signals from the wire feeder while in the cold-inching mode.

3. The method of claim 1, wherein said automatically prompting the operator of the welding system to manually reset the weight value of the consumable welding package is further based on a sequence of trigger signals from the welding tool.

4. The method of claim 1, wherein said automatically resetting is performed by the welding power source.

5. The method of claim 4, wherein said sensing is performed by the wire feeder that is in communication with the welding power source.

6. The method of claim 5, wherein the welding power source receives wire feed speed information and wire feed time duration information from the wire feeder.

7. The method of claim 4, further comprising receiving, by the welding power source, wire type information for the consumable welding package.

8. The method of claim 7, further comprising calculating, by the welding power source, wire density information based on the wire type information.

9. The method of claim 8, further comprising:
tracking a distance of welding wire fed; and
determining a weight of the welding wire fed based on the density information and the distance of welding wire fed.

10. The method of claim 1, further comprising:
accessing size and type information associated with the consumable welding package; and
generating density information associated with the welding wire based on the size and type information.

11. The method of claim 10, further comprising:
tracking a distance of welding wire fed; and
determining a weight of the welding wire fed based on the density information and the distance of welding wire fed.

12. The method of claim 11, further comprising subtracting the weight of the welding wire fed from a stored weight value to produce a weight remaining value.

13. The method of claim 12, wherein said at least one characteristic includes the weight remaining value.

* * * * *